United States Patent
Aarts

(10) Patent No.: US 7,321,529 B2
(45) Date of Patent: Jan. 22, 2008

(54) SHUFFLE DEVICE AND CENTRAL CONTROL DEVICE PROVIDED WITH THE SHUFFLE DEVICE

(75) Inventor: Ronaldus Maria Aarts, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 512 days.

(21) Appl. No.: 10/504,755

(22) PCT Filed: Feb. 3, 2003

(86) PCT No.: PCT/IB03/00358

§ 371 (c)(1),
(2), (4) Date: Aug. 17, 2004

(87) PCT Pub. No.: WO03/071544

PCT Pub. Date: Aug. 28, 2003

(65) Prior Publication Data

US 2005/0146986 A1    Jul. 7, 2005

(30) Foreign Application Priority Data

Feb. 20, 2002    (EP)    .................... 02075683

(51) Int. Cl.
*G11B 17/22*    (2006.01)
*H04B 11/00*    (2006.01)

(52) U.S. Cl. ..................... 369/30.28; 367/133

(58) Field of Classification Search ............. 369/30.28, 369/30.27, 30.26, 30.38, 30.4, 30.29, 30.06; 367/133; 713/193, 194, 153; 726/3, 7
See application file for complete search history.

(56) References Cited

U.S. PATENT DOCUMENTS 5,798,921 A    8/1998    Johnson et al.
6,031,797 A    2/2000    Van Ryzin et al.

FOREIGN PATENT DOCUMENTS

EP           1143732 A    10/2001
WO    WO 02061750        8/2002

*Primary Examiner*—Ali Neyzari
(74) *Attorney, Agent, or Firm*—Michael E. Belk

(57) ABSTRACT

A shuffle device for players with different types of storage medium such as CD, DVD, hard disk drive or random access memory. The shuffle device is provided in a particular central control device such as a remote control, a hand-held computer, a personal digital assistant or palmtop that is valuable for all the players of the (home) system. As the shuffle device includes hardware and software, thus such hardware and software are needed only once and can be used for different players using a single shuffle device, for example. This alleviates the need for each player to have its own shuffle device thus reducing the cost of each player. Meta data that are downloaded from the Internet, derived from a smart card, added by means of a voice-to-text-converter, or typed in by the user may be displayed on the central control system.

18 Claims, 1 Drawing Sheet

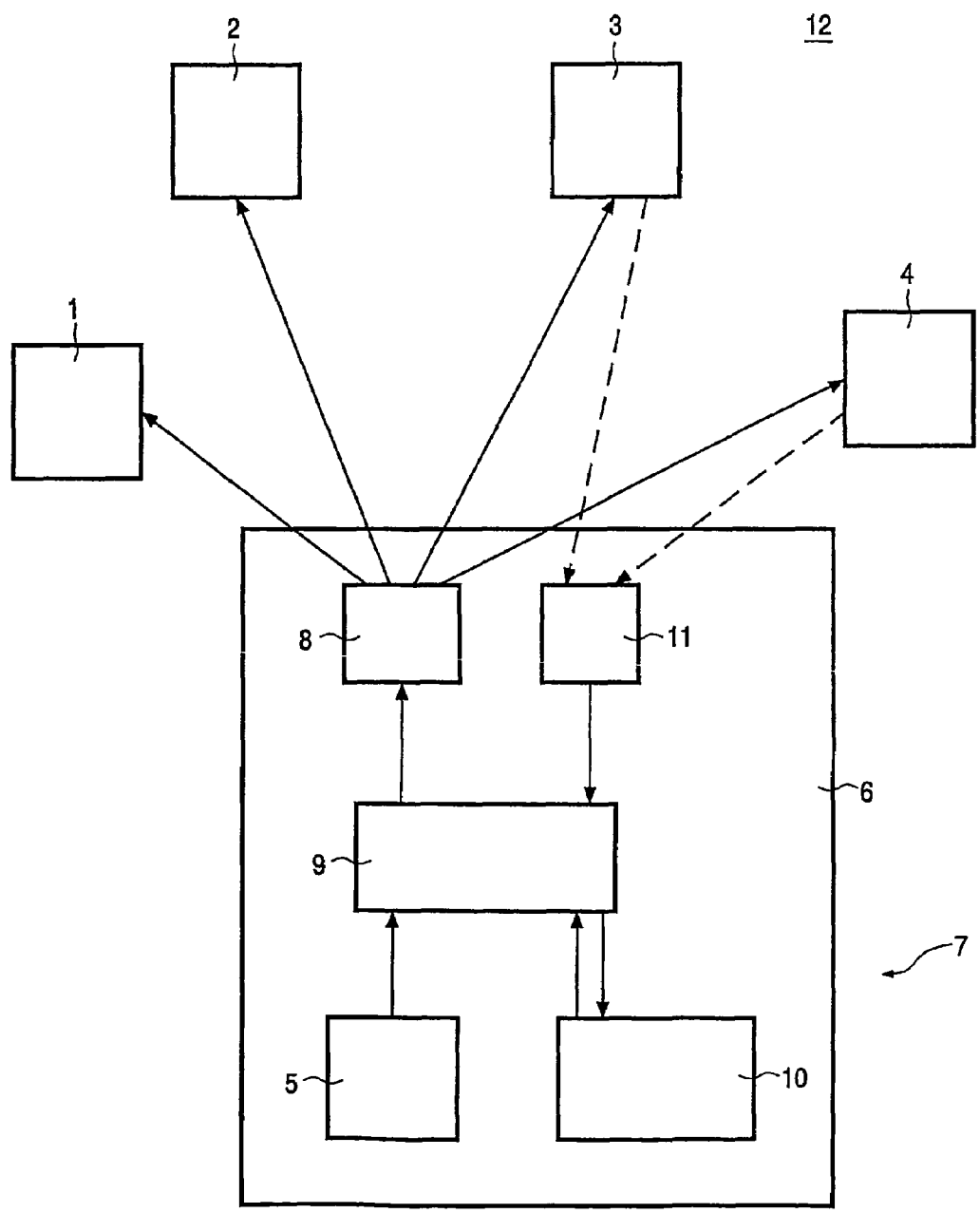

SHUFFLE DEVICE AND CENTRAL CONTROL DEVICE PROVIDED WITH THE SHUFFLE DEVICE

FIELD OF THE INVENTION

For standard shuffle modes the shuffle generating means is a separate device like a random track play list generator that is provided in a player, for example in a CD player. For the realization of a shuffle generator the corresponding hardware and software are needed. If a plurality of players is used in a system, every single player is equipped with the hardware and software necessary for realizing a shuffle mode.

BACKGROUND OF THE INVENTION

Nowadays different types of players for audio or video data are common such as CD players, DVD players, PCs that are equipped with a hard disk drive or players that use a random access memory for storing the audio and/or video data. Generally, every type of player has its own remote control. Intelligent remote controls are known in practice. These are remote controls that are capable of learning (infrared) codes from the different remote controls of the home entertainment equipment and then replace them. This shows the consumer's desire to use only one remote control for different apparatus of consumer electronics.

As mentioned, in modern home entertainment systems different types of players are combined. Nowadays all these apparatus are equipped with their own random track play list generator. The hardware and the software that are needed for realizing of the shuffle generator require space and cause costs.

EP 0 892 341 A1 reveals a system comprising a compact disk player and a remote control. The remote control or control unit has a display unit that displays data such as the number of the currently played track. The remote control receives this information from the compact disk player. This means the compact disk player is equipped with a transmitter and the remote control with a receiver. Of course, this remote control offers the conventional functions like causing the player to play, wind or rewind. Therefore, the remote control is equipped with a transmitter and the player with a corresponding receiver.

SUMMARY OF THE INVENTION

Therefore, it is an object of the invention to reduce the costs for the realization of shuffle modes of a system that combines at least two players.

The object is solved by using one shuffle device for several players that is external to the players in a central control device. The basic idea is that in a system that consists of at least two players, each equipped with a shuffle device, at least one of the shuffle devices is redundant. According to the invention only one shuffle device is necessary that is external to the players, but serves each of them.

It is advantageous to arrange the shuffle device in a central control device. Then the hardware and the software for the shuffle device neither need their own housing nor their own transmitter as the central control device is equipped with the necessary parts. When the shuffle device is in the central control device the central control device "knows" which track is being played and does not need a feedback from the player. As a consequence, the central control device only needs a unidirectional connection with the players. State of the art is a bidirectional connection that enables the central control device to receive from the player the information which track is currently being played and to display the number of the track. The central control device may be a remote control, a hand-held computer, a personal digital assistant or a palmtop.

When the central control device is equipped with a more detailed display such as the liquid crystal display of a palmtop or any other kind of screen, it is possible to combine the number of the track currently being played with meta data and to show the corresponding data on the display. The meta data may be graphics or text such as pictures of the artists or lyrics of the song.

The meta data may be downloaded from the Internet via an interface. The meta data can also be derived from a memory card such as a smart card or any other storage medium that is inserted in the housing of the central control device. Another possibility is to type in the meta data either using a keyboard or a touch-sensitive display. The keyboard may be directly connected to the central control device or to a personal computer. In the latter case the data typed in have to be transferred to the central control device, e.g. via an interface.

A further possibility of adding meta data is the use of a voice-to-text-converter that is coupled with the central control device.

For downloading meta data from the Internet an interface is necessary. But it is one advantage of the invention that the interface is only required once in the central control device instead of in every single player.

The player that is made to play in a randomly selected order might be a disk player such as a CD or DVD player or can for example use a random access memory or a hard disk drive as a storage medium. A magnetic RAM that has the advantage that the content of the storage is kept even when there is no power supply can be used as a random access memory (RAM). The advantage of the use of a static RAM is that it is a fast working storage. The use of a ferroelectric RAM is advantageous as the power consumption is low. The advantage of the use of a flash erasable programmable read only memory as a storage medium is that the data are maintained for a long period of time even without power supply.

BRIEF DESCRIPTION OF THE DRAWING

These and other aspects of the invention will be apparent from and elucidated with reference to the embodiment described hereinafter with FIG. 1 showing a block diagram with the shuffle device provided in the central control device and the different players that may be part of a system.

DETAILED DESCRIPTION OF THE DRAWINGS

FIG. 1 shows a block diagram 12 with players that have different kinds of storage medium 1, 2, 3, 4 and the inventive shuffle device 5 that is arranged in the housing 6 of the central control device 7. The storage medium may be a compact disk (CD) 1, a digital versatile disk (DVD) 2, a hard disk drive (HDD) 3 or a random access memory (RAM) 4. The random sequence generator 5 forwards the next track number to a transmitter 8 via a microcontroller 9. The transmitter 8 may for example work on an infrared basis like the standard IrDA of the Infrared Data Association or a radio basis like the bluetooth standard. Other cordless or corded systems for transmission are also possible. The transmitter 8 sends the number of the next track that is to be played to the corresponding player. The active player is predetermined by the user of the central control device 7. The central control device 7 may comprise a display 10 showing the number of the track that is playing. As the track number is generated in the shuffle device 5 it can be easily displayed. The display can also be used for showing other details like photos and lyrics concerning the track currently played. These additional details may be downloaded from the Internet or may be read from the recording medium by the active player and submitted to the central control device. It might be clear that if the active player submits the additional detail, the player comprises a transmitter and the central control device comprises a receiver. Of course, an interface 11, cordless or corded, is necessary for the download from the Internet, but the advantage of the inventive shuffle device is that this interface is only required once for the remote control and not once for every single player.

DESCRIPTION OF PREFERRED EMBODIMENT

A preferred embodiment is the use of a personal digital assistant (PDA) like a palmtop as a central control device with an infrared transmitter as an output and a display for lyrics or a photo.

The invention claimed is:

1. A shuffle device for a player, the shuffle device comprising a processor configured to cause the player play in a randomly selected order, wherein the shuffle device is external to the player, and wherein communication between the central control device and the player is only unidirectional from the shuffle device to the player.

2. The shuffle device as claimed in claim 1, wherein the shuffle device is provided in a central control device.

3. The shuffle device as claimed in claim 2, wherein the central control device is selected from the group of remote control, hand-held computer, personal digital assistant or palmtop.

4. The shuffle device as claimed in claim 1, wherein the player is a disk player.

5. The shuffle device as claimed in claim 4, wherein the player is a CD or DVD player.

6. The shuffle device as claimed in claim 4, wherein the player is equipped with a hard disk drive.

7. The shuffle device as claimed in claim 1, wherein the player uses a random access memory as a storage medium.

8. The shuffle device as claimed in claim 7, wherein the random access memory is a magnetic random access memory.

9. The shuffle device as claimed in claim 7, wherein the random access memory is a static random access memory.

10. The shuffle device as claimed in claim 7, wherein the random access memory is a ferroelectric random access memory.

11. The shuffle device as claimed in claim 1, wherein the player uses a flash erasable programmable read only memory as a storage medium.

12. The shuffle device as claimed in claim 1, wherein the shuffle device is a random track play list generator.

13. A central control device that is provided with a shuffle device, comprising a processor configured to cause the player play in a randomly selected order, wherein the shuffle device is external to the player, wherein the central control device combines a currently played track with meta data and displays the meta data on a display, and wherein communication between the central control device and the player is only unidirectional from the central control device to the player.

14. The central control device as claimed in claim 13, wherein the meta data are downloaded from the Internet.

15. The central control device as claimed in claim 13, wherein the meta data are typed in by a user.

16. The central control device as claimed in claim 13, wherein the meta data are added by means of a voice-to-text-converter.

17. The central control device as claimed in claim 13, wherein the display is a touch-sensitive display and used for the input or typing in of data.

18. The central control device as claimed in claim 13, wherein meta data are on a memory card insertable in the central control device.

* * * * *